M. F. McINTYRE.
Washers for Nut-Locks.

No. 136,848.

Patented March 18, 1873.

Witnesses.

Inventor.
Malcolm F. McIntyre
By E. R. Brown,
Attorney.

UNITED STATES PATENT OFFICE.

MALCOLM F. McINTYRE, OF GIRARD, PENNSYLVANIA.

IMPROVEMENT IN WASHERS FOR NUT-LOCKS.

Specification forming part of Letters Patent No. 136,848, dated March 18, 1873.

*To all whom it may concern:*

Be it known that I, MALCOLM F. MCINTYRE, of Girard, in the county of Erie and State of Pennsylvania, have invented a new and useful Improved Nut-Lock and Washer; and I do hereby declare that the following is a full, clear, and exact description thereof, sufficient to enable those skilled in the art to which my invention appertains to make and use the same, reference being had to the accompanying drawing making part of this specification, and to the letters and figures marked thereon.

My invention relates to certain improvements on that for which Letters Patent were granted to me, dated December 10, 1872, and numbered 133,873; and it consists in a circular washer provided with projections on its under side to prevent it from turning when used upon wood, and an overhanging shoulder to prevent it from turning when used upon iron.

Figure 1:
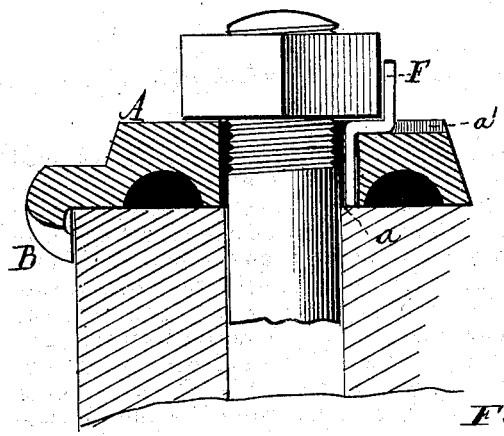
Figure 2:
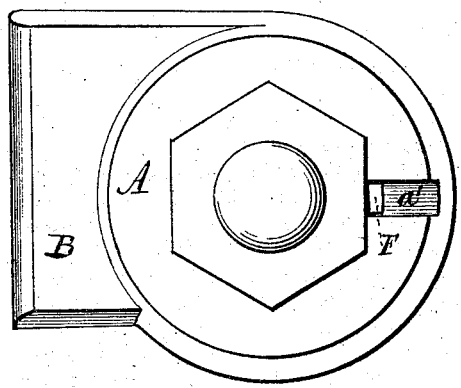
Figure 3:
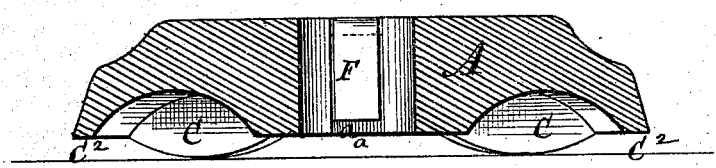
Figure 4:
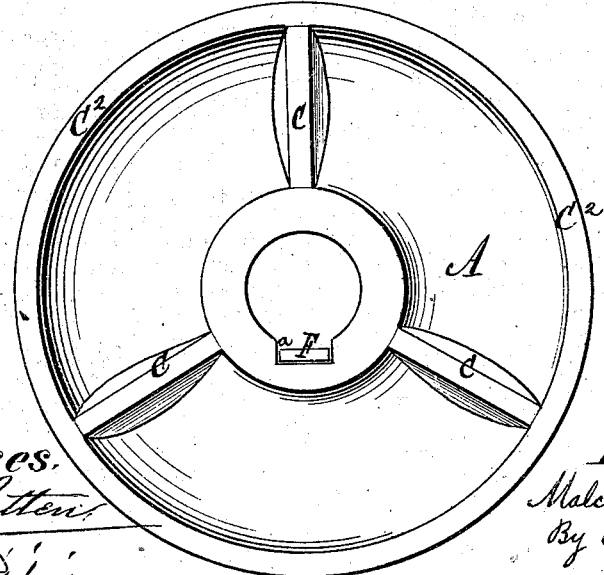

In the accompanying drawing, Figure 1 is a sectional view representing my improved washer formed with an overhanging shoulder and applied to a fish-plate or other article of iron. Fig. 2 is a plan or top view of the washer. Fig. 3 is a sectional view of a washer, with projections formed on its under side to prevent it from turning when used upon wood. Fig. 4 is a bottom view of the same.

The locking device is similar to the one shown and described in my patent of December 10, 1872, aforesaid, consisting of a metallic rod inserted in a notch in the washer and bent up against the nut.

The washer A is made of brass or any other suitable metal, with a notch, $a$, in the perforation and a groove, $a'$, in the face, to receive the nut-locking rod F, which is inserted in the notch $a$, and bent down into the groove $a'$, until the nut is screwed home, when it is turned up against the nut, as shown in Figs. 1 and 2. When the washer is to be used upon a metallic fish-plate or other hard and unyielding substance it is formed with an overhanging shoulder, B, which engages with the edge or side of the projecting portion, and prevents the washer from turning. When the washer is to be used upon wood it is formed with tongues or downwardly-projecting ribs, C, on its under side, extending radially from the central opening to the outer edge of the washer. The under side of the washer is hollowed out between the ribs C and between the central opening and the outer edge, so that said outer edge forms a downwardly-projecting flange, $C^2$. The ribs C and the flange $C^2$ engage with cavities or depressions of corresponding form made in the wood to receive them, and thus hold the washer securely and prevent it from turning, and at the same time serve to brace or clamp the wood and prevent it from splitting.

This latter form is particularly applicable to bridge and car building, where the washer comes in contact with wood.

What I claim as new, and desire to secure by Letters Patent, is—

The washer A formed with the radial ribs C and flange $C^2$ and hollowed out on its under side, so that said ribs and flange may engage with suitable depressions in the wood, plate, or bar, in combination with the key F, substantially as shown and described.

The above specification of my invention signed by me this 24th day of October, 1872.

MALCOLM F. McINTYRE.

Witnesses:
 C. F. WEBSTER,
 WM. KIBLER.